United States Patent
Salmimaa et al.

(10) Patent No.: US 12,375,637 B2
(45) Date of Patent: Jul. 29, 2025

(54) AN APPARATUS, METHOD, COMPUTER PROGRAM FOR DISPLAYING CONTENT TO A USER

(71) Applicant: Nokia Technologies Oy, Espoo (FI)

(72) Inventors: Marja Pauliina Salmimaa, Tampere (FI); Toni Johan Järvenpää, Tampere (FI); Arto Juhani Lehtiniemi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 18/360,050

(22) Filed: Jul. 27, 2023

(65) Prior Publication Data

US 2024/0073398 A1 Feb. 29, 2024

(30) Foreign Application Priority Data

Aug. 25, 2022 (EP) .................................. 22192084

(51) Int. Cl.
  *H04N 13/296* (2018.01)
  *G02B 27/09* (2006.01)
  (Continued)

(52) U.S. Cl.
  CPC ....... *H04N 13/296* (2018.05); *G02B 27/0977* (2013.01); *G06F 1/1616* (2013.01);
  (Continued)

(58) Field of Classification Search
  CPC ............... H04N 13/296; H04N 13/117; G02B 27/0977; G02B 27/0093; G06F 1/1616;
  (Continued)

(56) References Cited

U.S. PATENT DOCUMENTS

| 4,636,782 A * | 1/1987 | Nakamura ............. B60K 37/00 340/461 |
| 9,012,846 B2 * | 4/2015 | Almalki ................. G01N 21/55 356/3 |

(Continued)

FOREIGN PATENT DOCUMENTS

EP      0611470 B1 *    7/1998

OTHER PUBLICATIONS

Kang (NPL "Content-aware image retargeting for image display on foldable mobile devices," Procedia Computer Science 2015) (Year: 2015).*

(Continued)

*Primary Examiner* — Shadan E Haghani
(74) *Attorney, Agent, or Firm* — McCarter & English, LLP

(57) ABSTRACT

An apparatus comprising:
  a first display for displaying a first image;
  a second display for displaying a second image;
  a reflection surface configured to reflect the first image displayed on the first display towards a user of the apparatus;
  means for user adjustment of an angle between the first display and the reflection surface; and
  a controller configured to adapt the first image displayed on the first display so that it can be viewed via reflection and
  configured to control display of the first image on the first display and the second image on the second display wherein simultaneous viewing of a reflection of the first image displayed on the first display in the reflection surface and of the second image displayed on the second display creates a combination image.

20 Claims, 6 Drawing Sheets

(51) Int. Cl.
  *G06F 1/16*      (2006.01)
  *G06F 3/0488*    (2022.01)
  *H04N 13/117*    (2018.01)
  *G06F 3/01*      (2006.01)

(52) U.S. Cl.
  CPC ......... *G06F 3/0488* (2013.01); *H04N 13/117* (2018.05); *G06F 3/011* (2013.01)

(58) Field of Classification Search
  CPC ...... G06F 3/0488; G06F 3/011; G06F 1/1637; G06F 1/1677; G06F 3/1423; G06F 21/84; G09G 2320/028; G09G 2340/14; G09G 2354/00; G09G 2358/00

See application file for complete search history.

(56) References Cited

U.S. PATENT DOCUMENTS

| | | | |
|---|---|---|---|
| 11,790,815 B1* | 10/2023 | Yoshiga | G09G 3/001 |
| | | | 345/4 |
| 2014/0146304 A1 | 5/2014 | Almalki | |
| 2016/0240013 A1 | 8/2016 | Spitzer | |
| 2016/0371889 A1 | 12/2016 | Kim et al. | |
| 2019/0220116 A1* | 7/2019 | Godlieb | G02B 5/0808 |

OTHER PUBLICATIONS

NPL: "Visual Crypto Displays Enabling Secure Communications," Springer-Verlag Berlin Heidelberg 2004 (Year: 2004).*
NPL: "Geometrically Consistent Stereo Seam Carving," IEEE 2011 (Year: 2011).*
Extended European Search Report received for corresponding European Patent Application No. 22192084.6, dated Jan. 26, 2023, 9 pages.

* cited by examiner

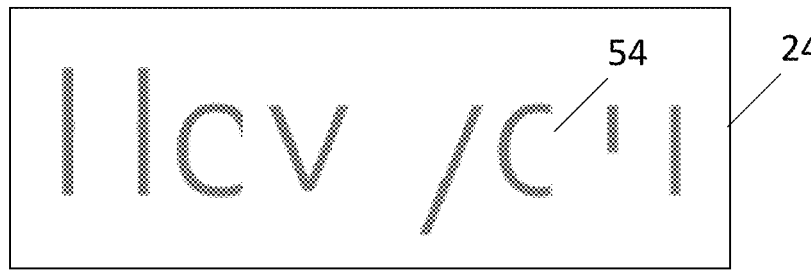
FIG 7A
FIG 7B
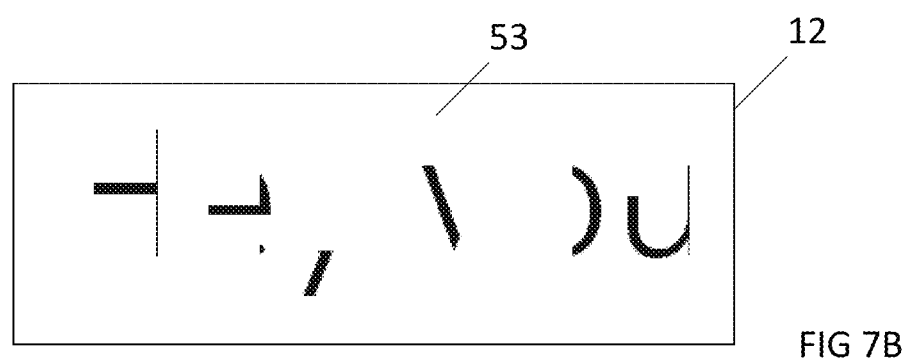
FIG 7C
FIG 7D

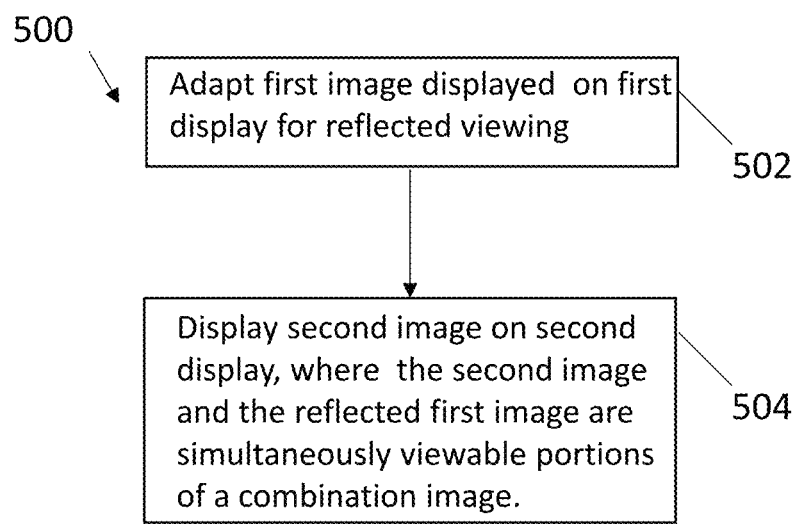
FIG 10
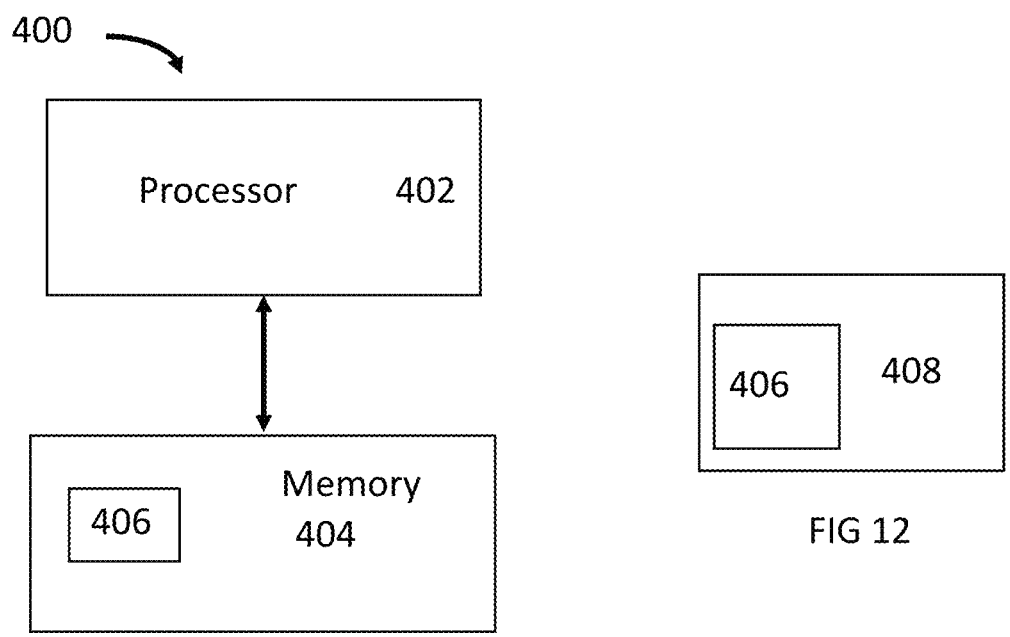
FIG 11
FIG 12

AN APPARATUS, METHOD, COMPUTER PROGRAM FOR DISPLAYING CONTENT TO A USER

TECHNOLOGICAL FIELD

Examples of the disclosure relate to an apparatus, method, computer program for displaying content to a user.

BACKGROUND

Content displayed by an apparatus may be private or confidential.

It is therefore desirable to prevent or frustrate onlookers from observing content. This can prevent visual hacking.

A computer privacy screen can be placed in front of a laptop screen to narrow the usable field of view of the display. In some examples, a polarization filter is used which acts as micro louvres. Such privacy screens reduce the brightness of the display.

BRIEF SUMMARY

According to various, but not necessarily all, examples there is provided an apparatus comprising:
  a first display for displaying a first image;
  a second display for displaying a second image;
  a reflection surface configured to reflect the first image displayed on the first display towards a user of the apparatus;
  means for user adjustment of an angle between the first display and the reflection surface; and
  a controller configured to adapt the first image displayed on the first display so that it can be viewed via reflection and
  configured to control display of the first image on the first display and the second image on the second display wherein simultaneous viewing of a reflection of the first image displayed on the first display in the reflection surface and of the second image displayed on the second display creates a combination image.

In some but not necessarily all examples, the controller is configured to adapt the first image displayed on the first display so that is mirror-image text that in reflection forms readable text.

In some but not necessarily all examples, the controller is configured to shift the first image in dependence upon an angle between the first display and the reflection surface.

In some but not necessarily all examples, the controller is configured to automatically shift the first image in dependence upon a change in a detected angle between the first display and the reflection surface and/or to manually shift the first image to compensate for a change in the angle between the first display and the reflection surface.

In some but not necessarily all examples, the second image displayed on the second display is configured to be viewed directly.

In some but not necessarily all examples, the controller is configured to cause a relative shift between the first image displayed on the first display and the second image displayed in the second display to control registration between the first image and the second image in the combination image viewed by the user.

In some but not necessarily all examples, the shift is adjusted automatically to maintain registration between the first image and the second image in the combination image.

In some but not necessarily all examples, the shift is adjusted automatically in dependence upon a change in the angle between the first display and the reflection surface and/or in dependence upon a detected user position viewing angle.

In some but not necessarily all examples, the controller is configured to decompose an image into the first image and the second image, wherein simultaneous viewing of a reflection of the first image displayed on the first display in the reflection surface and of the displayed second image substantially recreates the image In some but not necessarily all examples, the first image is an image of a first focal plane of the combination image and the second image is an image of a second focal plane, different to the first focal plane, of the combination image wherein the combination image is a combination of the image of the first focal plane and the image of the second focal plane.

In some but not necessarily all examples, the first image comprises portions of sentences and/or portions of words and/or portions of characters and the second image comprises different portions of sentences and/or different portions of words and/or different portions of characters, wherein the combination image has semantic meaning that is rendered in the clear when simultaneously viewing a reflection of the first image displayed on the first display in the reflection surface and the second image displayed on the second display.

In some but not necessarily all examples, the reflection surface is configured as a touch sensitive surface.

In some but not necessarily all examples, the reflection surface is transparent and overlays the second display.

According to various, but not necessarily all, examples there is provided a computer program comprising computer program instructions that when loaded into one or more processors causes:
  adaptation of a first image displayed on a first display so that it can be viewed by a user via reflection at a reflection surface that has a user-adjustable angle relative to the first display and
  simultaneous display of a second image on a second display wherein the second image and the reflected first image are portions of a combination image.

According to various, but not necessarily all, examples there is provided a method comprising: adapting a first image displayed on a first display so that it can be viewed by a user via reflection at a reflection surface that has a user-adjustable angle relative to the first display; and simultaneously displaying a second image on a second display wherein the second image and the reflected first image are portions of a combination image.

According to various, but not necessarily all, examples there is provided examples as claimed in the appended claims.

This 'Brief Summary' section, describes various features that may be features of any of the examples described. The description of a function should additionally be considered to also disclose any means suitable for performing that function While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which:

FIG. 7A shows an example of a second image displayed on a second display;

FIG. 7B shows an example of a reflected first image, that is a first image reflected from a reflection surface;

FIG. 7C shows a combination image formed from a superposition of the reflected first image and the second image from a viewpoint of the user;

FIG. 7D shows an image formed from the reflected first image and the second image from a viewpoint different from that of the user;

FIG. 10 illustrates a method;

FIG. 11 illustrates a controller for the apparatus;

FIG. 12 illustrates a computer program for the apparatus.

Figure 1:
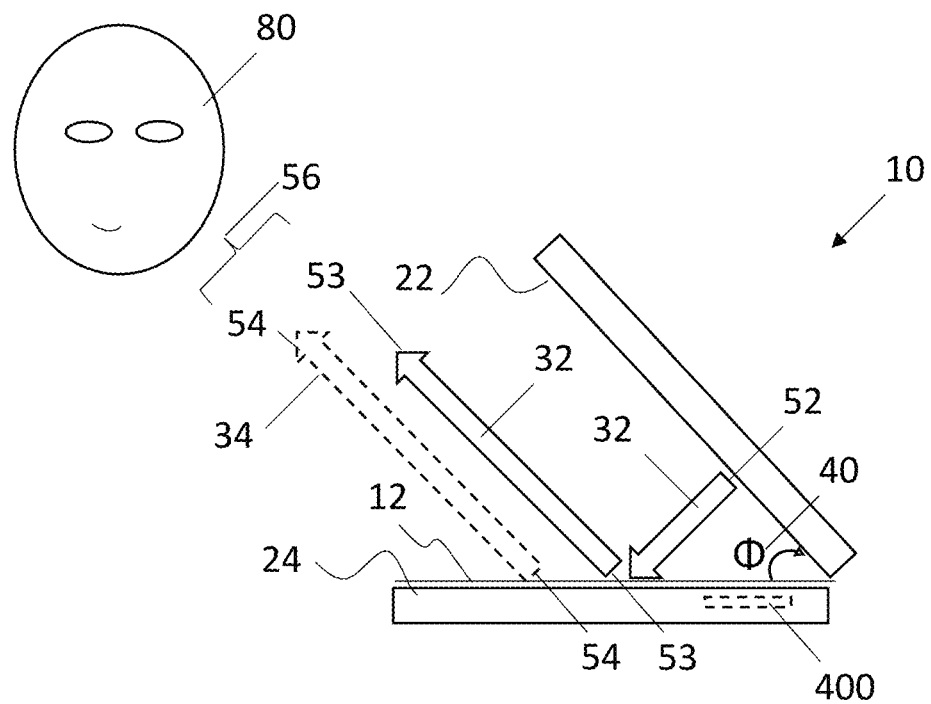
FIG. 1 shows an example of an apparatus in a first configuration.

The FIGURES are not necessarily to scale. Certain features and views of the FIGURES can be shown schematically or exaggerated in scale in the interest of clarity and conciseness. For example, the dimensions of some elements in the FIGURES can be exaggerated relative to other elements to aid explication. Similar reference numerals are used in the FIGURES to designate similar features. For clarity, all reference numerals are not necessarily displayed in all FIGURES.

DETAILED DESCRIPTION

The FIGs illustrate various examples of an apparatus 10. In at least some examples the apparatus 10 is a security apparatus that protects displayed content from being overlooked. The apparatus 10 can, for example preserve privacy of displayed content.

The apparatus 10 comprises: a first display 22 for displaying a first image 52; a second display 24 for displaying a second image 54; and a reflection surface 12.

The reflection surface 12 is configured to reflect the first image 52 displayed on the first display 22. The reflection surface 12 is configured for specular reflection of the first image 52 displayed on the first display 22. For specular reflection the angle of incidence equals the angle of reflection.

The apparatus 10 comprises means for user adjustment of an angle 40 between the first display 22 and the reflection surface 12.

The angle 40 can, for example, be adjusted by a user 80 such that the reflection surface 12 reflects the first image 52 displayed on the first display 22 towards the user 80 of the apparatus 10 to form a reflected image 53.

The apparatus 10 comprises a controller 400 configured to control display of the first image 52 on the first display 22 and the second image 54 on the second display 24 such that simultaneous viewing of a reflection 53 of the first image 52 displayed on the first display 22 in the reflection surface 12 and of the second image 54 displayed on the second display 24 creates a combination image 56 for the user 80.

The apparatus 10 comprises a controller 400 configured to adapt the first image 52 displayed on the first display 22 so that it can be viewed via reflection.

The first display 22 produces first light 32 that forms the first image 52. The first light 32 is specularly reflected off the reflection surface 12 to form, as a virtual image, the reflected first image 53. The second display 24 produces second light 34 that forms as a real image, the second image 54. A user 80 simultaneously views a superposition of the reflected first image 53 and the second image 54 as a combination image 56.

The combination of two overlayed and superimposed images defines the complete information meant to be perceived by the user 80.

Figure 2:
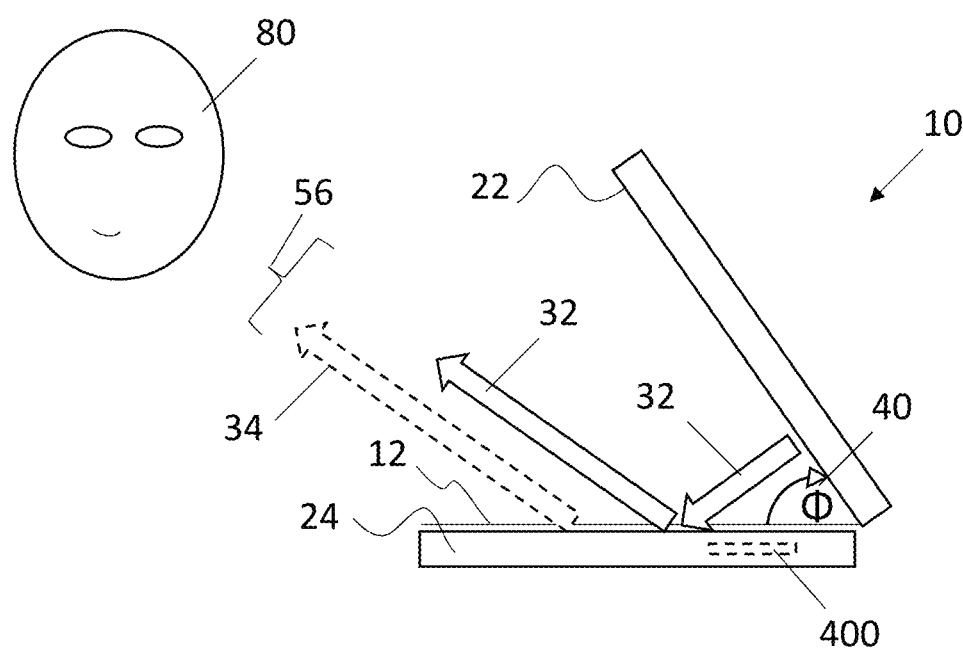
FIG. 2 shows an example of an apparatus in a second configuration.
Figure 3A:
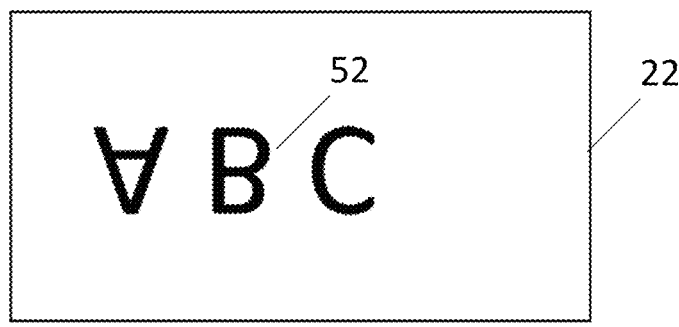
FIG. 3A shows an example of a first image displayed on a first display.
Figure 3B:
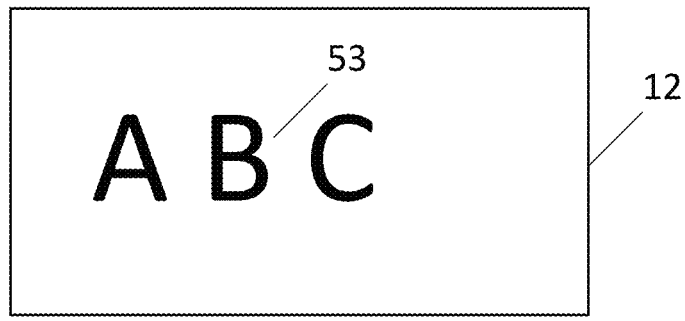
FIG. 3B shows an example of a reflected first image, that is the first image reflected from a reflection surface.
Figure 4:
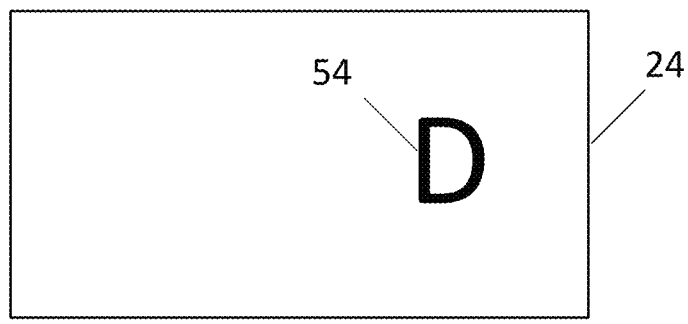
FIG. 4 shows an example of a second image displayed on a second display.
Figure 5:
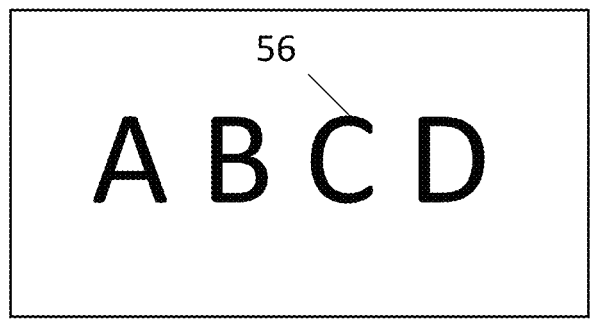
FIG. 5 shows a combination image formed from the superposition of the reflected first image and the second image.
Figure 6A:
FIG. 6A shows an example of original content.
Figure 6B:
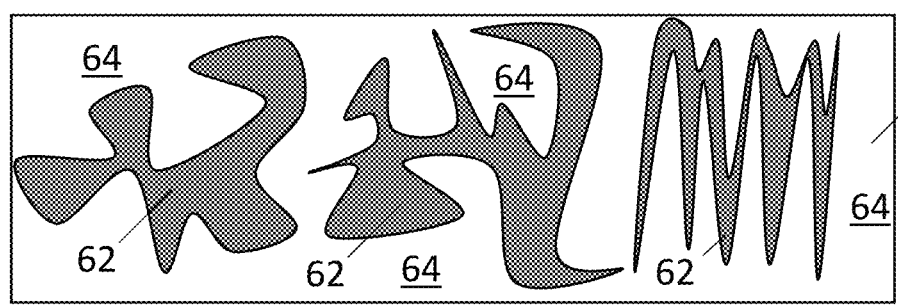
FIG. 6B shows an example of a binary filter for the original content.
Figure 6C:
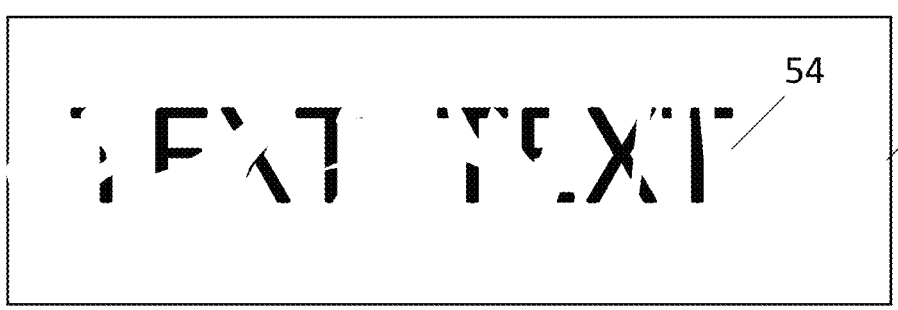
FIG. 6C shows an example of a second image of a second display formed by filtering the original content.
Figure 6D:
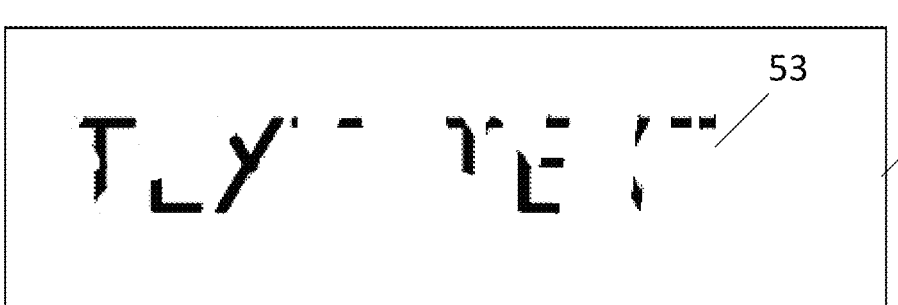
FIG. 6D shows an example of a reflected first image, that is a first image reflected from a reflection surface where the first image is formed by filtering the original content and mirror-reflecting the filtered content.
Figure 6E:
FIG. 6E shows a combination image formed from a superposition of the reflected first image and the second image.

FIGS. 1 and 2 illustrate the same apparatus 10 in different physical configurations. The angle 40 between the first display 22 and the reflection surface differs between FIGS. 1 and 2.

The apparatus 10 comprises means for user adjustment of an angle 40 between the first display 22 and the reflection surface 12. The user 80 can thus increase the angle 40 and change from the configuration illustrated in FIG. 1 to the configuration illustrated in FIG. 2. The user 80 can thus decrease the angle 40 and change from the configuration illustrated in FIG. 2 to the configuration illustrated in FIG. 1. It should be appreciated that in at least some examples, the apparatus 10 is configured to have multiple stable configurations with different angles 40 between the first display 22 and the reflection surface 12. These angles 40 can be greater than, less than or intermediate to the angles 40 illustrated.

As the angle 40 is adjusted, the controller 400 controls display of the first image 52 on the first display 22 and the second image 54 on the second display 24 such that simultaneous viewing of a reflection 53 of the first image 52 displayed on the first display 22 in the reflection surface 12 and of the second image 54 displayed on the second display 24 creates a desired combination image 56 for the user.

In the examples illustrated, but not necessarily all examples, the first display 22 and the second display 24 rotate relative to each other about a hinge.

In the examples illustrated, but not necessarily all examples, the reflection surface 12 is a layer, for example an external layer of the second display 24.

In the examples illustrated, but not necessarily all examples, a display module provides the second display 24 and the reflection surface 12 as a single unit.

In the examples illustrated, but not necessarily all examples, a second display 24 is an emissive display, for example, a light emitting diode display, rather than a transmissive liquid crystal display.

FIGS. 3A, 3B, 4 and 5 illustrates a simple example of how the controller 400 can control the first image 52 and the second image 54 to create a desired combination image 56.

In at least some examples, the reflection surface 12 overlies the second display 24, as illustrated in FIG. 1. In this example, but not necessarily all examples, the reflection surface 12 is transparent and overlays the second display 24. The reflection surface 12 is transparent in at least one direction so that second light 34 passes from the second display 24 to the user 80 such that a second image 54 can be observed at the second display 24 through the reflection surface 12.

The combination image 56 viewed by the user 80 is dependent upon the second image 54 displayed by the second display 24 and the reflected first image 53 reflected by the overlying reflection surface 12.

The reflected first image 53 reflected by the overlying reflection surface 12 is dependent upon the first image 52 formed by the first display 22.

In this example, the combination image 56 has semantic meaning and can be read. Read in this sense means that information is conveyed to the user that depends upon the order and arrangement of visual elements. A simple example is text, which uses an ordered collection of defined symbols (letters) to form an image that has semantic meaning (a word). In some examples, the word is a dictionary word and has a defined meaning. In other examples, the word is a non-dictionary word such as an acronym, trademark, name, or other signifier or symbol etc.

In this example, the combination image 56 creates the word "ABCD". This is formed from two portions "ABC" and "D". In this example, the portions comprise whole letters but this is not a requirement. It merely aids explanation.

In this example, the first portion provided by the reflected first image 53 is "ABC" and the second portion provided by the second display 24 is "D". However, this is arbitrary. The important feature is that a first portion is provided by the reflected first image 53 and a second portion is provided by the second display 24 and that the first and second portions when viewed in combination reproduce the desired combination image 56.

In order to produce the correct first portion in the reflected surface 12 as the reflected first image 53, the first display 22 displays a mirror image of the correct first portion as the first image 52. The mirror-image content displayed as the first image 52, when reflected in the reflection surface 12, forms the non-mirror-image content as the reflected first image 53. Thus, in this example, the first display 22 displays as the first image 52 a mirror image of the first portion "ABC".

The controller 400 is configured to control display of the first image 52 on the first display 22 and the second image 54 on the second display 24 such that simultaneous viewing by the user 80 of a reflection 53 of the first image 52 displayed on the first display 22 in the reflection surface 12 and of the second image 54 displayed on the second display 24 creates a combination image 56 for the user 80.

The controller 400 is configured to adapt the first image 52 displayed on the first display 22 so that it can be viewed via reflection. In this example, the controller 400 is configured to adapt the first image 52 displayed on the first display 22 so that it is mirror-image text that in reflection forms readable text.

The apparatus 10 is flexible, bendable, foldable, deformable or otherwise configurable so that the spatial relationship of the first display 22 and the reflection surface 12 can change. The apparatus 10 is configured to determine the spatial relationship of the first display 22 and the reflection surface 12 (or the second display 24) The apparatus 10 comprises means for user 80 adjustment of an angle 40 between the first display 22 and the reflection surface 12.

In at least some examples, the apparatus 10 is configured to shift the first image 52 within the first display 22 in dependence upon the angle 40 between the first display 22 and the reflection surface 12.

For example, the controller 400 can be configured to automatically shift the first image 52 in dependence upon a change in a detected angle 40 between the first display 22 and the reflection surface 12. For example, additionally or alternatively, the controller 400 can be configured to enable a manual shift by the user 80 of the first image 52 to compensate for a change in the angle 40 between the first display 22 and the reflection surface 12.

The controller 400 is configured to cause a relative shift between the first image 52 displayed on the first display 22 and the second image 54 displayed in the second display 24 to control registration between the first image 52 and the second image 54 in the combination image 56 viewed by the user 80. The registration enables the desired combination image 56 to be viewed by the user 80 In at least some examples, the shift is adjusted automatically to maintain registration between the first image 52 and the second image 54 in the combination image 56.

The shift can, for example, be a shift in the two-dimensions of the image plane.

In the example illustrated, the second image 54 displayed on the second display 24 is configured to be viewed directly.

For an apparatus 10 where the first display 22 is planar in two-dimensions and the second display is planar in two-dimensions and the first and second displays 22, 24 rotate relative to each other about an axis parallel to an x-axis and perpendicular to a y1 axis in the first display 22 and a y2 axis in the second display 24, then a pixel at (x, y1) on the first display 22 is located at a position (x, y2) on the reflective surface 12 and an apparent position (x, y2") on the second display 24 when viewed by the user 80. Assuming that the reflective surface is two-dimensional and parallel to the second display 24 but vertically offset in a z2 direction by z, then if the angle 40 between the first display 22 and the second display 24 (reflection surface 12) is $\Phi$ then: y1=y2 cos $\Phi$ and y2"=y2+z tan $\Phi$. The change in registration ($\Delta$y2") can therefore be determined as a function of a change in angle 40 ($\Delta\Phi$).

It is also possible to calibrate an apparatus 10.

In at least some examples, the shift can be configured to account for a position of the user 80 (especially position of eyes of the user) relative to the apparatus 10. The position of the user 80 relative to the apparatus 10 can, for example, be measured using sensors or can be inferred from a user-adjustment made to the angle 40. For example, a user 80 can be illuminated using a spatially variable infrared pattern and the reflected pattern can be detected by the apparatus 10 and used to determine a changing position of the user 80. For example, light detection and ranging (lidar) can be used to position an object as can a camera or cameras.

Thus, the shift can be adjusted automatically in dependence upon a change in the angle 40 between the first display 22 and the reflection surface 12 and/or in dependence upon a detected user 80 position viewing angle.

As illustrated in FIGS. 6A, 6B, 6C, 6D and 6E in at least some examples, the controller 400 is configured to decompose an original image 70 into the first image 52 and the second image 54, wherein simultaneous viewing of a reflected first image 53 (the first image 52 displayed on the first display 22 and reflected in the reflection surface 12) and of the displayed second image 54 substantially recreates the original image 70 as a combination image 56.

In the example illustrated, the original content 70 (the original image) is filtered using a spatial filter 60. The spatial filter 60 in this example is a simple transmission/non-transmission binary filter, however, other types of filters 60 can be used.

In this example, the filter 60 has first areas 62 that are transmissive (positive) for the reflected first image 53 and non-transmissive (negative) for second image 54. The first areas 62, when applied to the original content 70, would create a notional reflected first image 53, which is then transformed into a mirror image to produce the first image 52.

In this example, the filter 60 has second areas 64 that are transmissive (positive) for the second image 54 and non-transmissive (negative) for reflected first image 53. The second areas 44, when applied to the original content 70, would create the second image 54.

Thus, the original content 70 is processed using a mirror image of a positive template to create the first image 52 and is processed using the non-mirror-image negative template to create the second image 54. The reflected first image 53 is then the non-mirror-image positive template. The combination image 56 comprises the non-mirror image positive template from the reflected first image 53 and the non-mirror image negative template from the displayed second image 54. If these are in register, the combination image 56 substantially recreates the original content 70.

The registration of the reflected first image 53 and the displayed second image is dependent upon viewing angle and the angle between the first display 22 and the second display 24/reflection surface 12. Therefore, a non-user trying to view the intended combination image (the original content) would see a different image that is, for example, not readable. This is illustrated in FIG. 7D.

An example of a displayed second image 54 is illustrated in FIG. 7A. The reflected first image 53 for this example is illustrated in FIG. 7B. The resulting combination image 56 as seen by the user 80 is illustrated in FIG. 7C. This substantially recreates the original content. The image 58 as seen by a non-user is illustrated in FIG. 7D. This does not substantially recreate the original content.

Only after superimposing to form the combination image 56, can the combination image 56 be viewed. In this example, the combination message 56 is a message and only after superimposing to form the combination image 56, can the full message be read. Any display or view perceived alone would not be sufficient for understanding the content of the message.

It is possible that the combined image 56 doesn't comprise a message but additionally or alternatively comprises other content, for example, a photo, graphic or other image.

In at least some examples, the first image 52 comprises portions of sentences and/or portions of words and/or portions of characters and the second image 54 comprises different portions of sentences and/or different portions of words and/or different portions of characters, wherein the combination image 56 has semantic meaning that is rendered in the clear when simultaneously viewing a reflection of the first image 52 displayed on the first display 22 in the reflection surface 12 and the second image 54 displayed on the second display 24.

The apparatus 10 therefore applies an effective cipher to the original content that limits decryption to a particular viewing angle. The encrypted content is rendered in the clear when viewed from a particular viewing angle but remains obscured/encrypted from other viewing angles.

The presence and alignment of the reflected first image 53 and the second image 54 are required to recover semantic meaning and this alignment is dependent upon viewing angle.

It will therefore be appreciated that, in at least some examples, the apparatus 10 is a security apparatus that protects displayed content from being overlooked.

In some but not necessarily all example, the first image 52 is an image of a first focal plane of the combination image 56 and the second image 54 is an image of a second focal plane, different to the first focal plane, of the combination image 56 wherein the combination image 56 is a combination of the image of the first focal plane and the image of the second focal plane.

The physical separation between the focus layers creates a true 3D display. The two physically displaced display layers produce a 3D depth cue. This can be used for adding visual 3D effects to certain type of content. e.g., game or user interface components.

Figure 8:
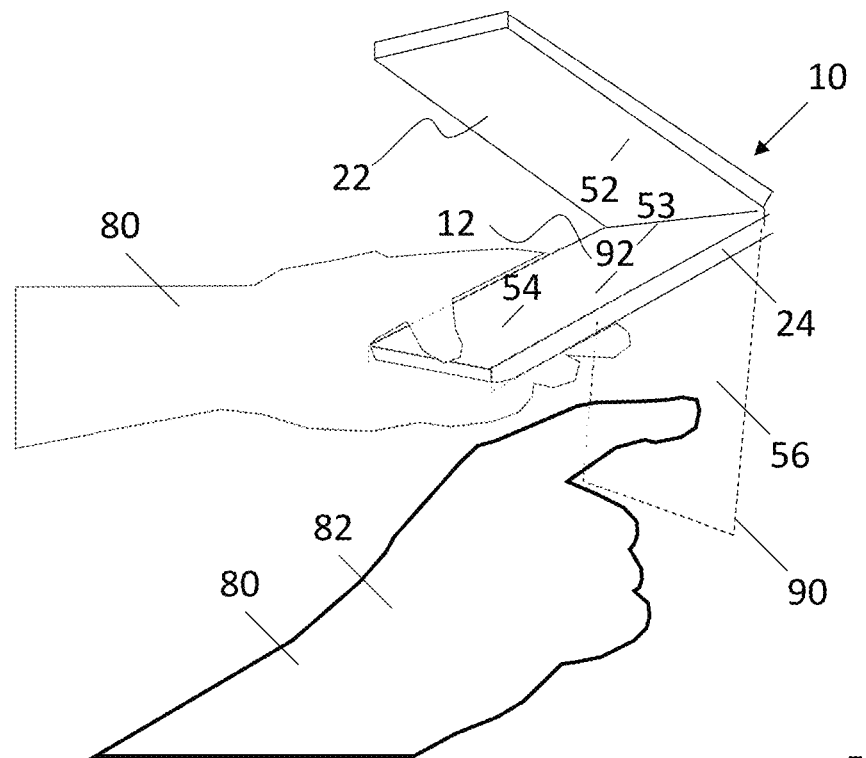
FIG. 8 illustrates an example of user input at the apparatus.
Figure 9:
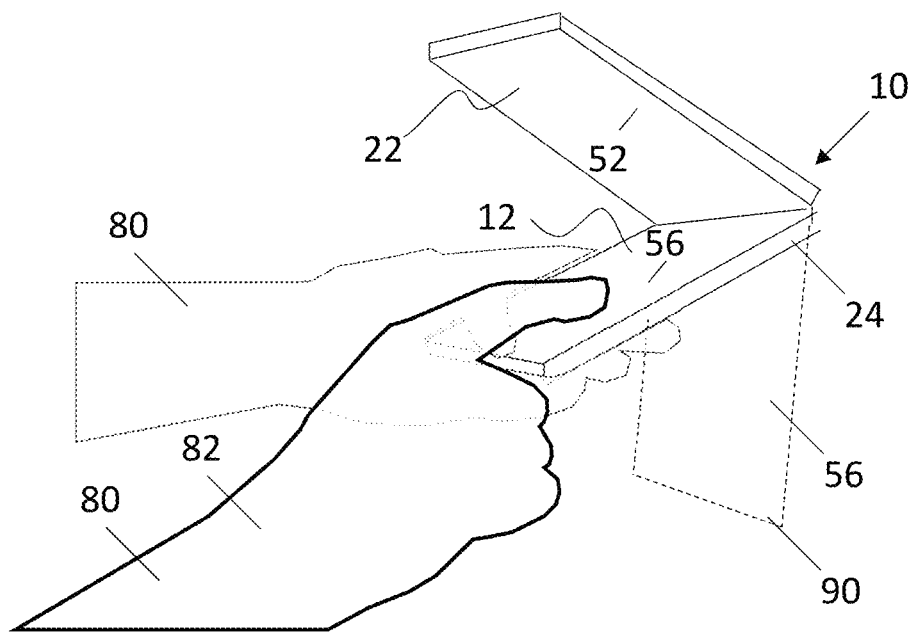
FIG. 9 illustrates an example of additional or alternative user input at the apparatus.

As illustrated in FIGS. 8 and 9, in some but not necessarily all example, the apparatus 10 is configured for gesture input.

In FIG. 8, a user 80 interacts with the apparatus at a virtual screen 90 that comprises the combination image 56. The apparatus 10 is configured to track motion of a hand 82 of the user 80 behind the second display 24. An image representing a location of the user's hand 82 can be reproduced in the combination images 56, for example, as part of the second image 24, as a selection device 92. The user 80 can for example interact with widgets displayed in the combination image 56 using the selection device 92. The operation of the selection device 92 can be controlled by movement of the user's hand 82.

In FIG. 9, the reflection surface 12 is configured as a touch sensitive device. A user 80 interacts with the apparatus 10 at the reflection surface 12. The apparatus 10 is configured to track motion of a user's hand 82 at or in front of the touch sensitive reflection surface 12. The user 80 can for example interact with widgets displayed in the combination image 56 using touch as a selection input FIG. 10 illustrates an example of a method 500. In this example, but not necessarily all examples, the method 500 is a method for securing displayed content.

At block 502, the method 500 comprises adapting a first image 52 displayed on a first display 22 so that it can be viewed (e.g. read) by a user 80 via reflection at a reflection surface 12 that has a user-adjustable angle 40 relative to the first display 22.

At block 504, the method 500 comprises simultaneously displaying a second image 54 on a second display 24 wherein the second image 54 and the reflected first image 53 are portions of a combination image 56.

The method 500 may be used intermittently. For example, it may be used only when privacy is determined to be required. For example, when it is detected that input of login credentials is required, or it is detected that a message marked as private is to be viewed or it is detected that a document marked as confidential is to be viewed.

To aid understanding some use cases are described. These can be performed by an apparatus 10 or can be performed by different apparatus 10.

Use case 1: the apparatus 10 recognizes the user 80 by using face recognition techniques. The user 80 can adjust the fold angle 40 and the orientation of the apparatus 10 with respect to herself. The second display 24 can be blanked and used solely for reflecting the first image 52 produced by the first display 22. The user 80 sees only the virtual reflected first image 53. The (virtual) reflected first image 53 from the reflected surface 12 has a limited viewing cone and thus the displayed content is not visible to large angles. As viewing from the side gets harder, viewing privacy is increased, and the level of privacy can be controlled by the tilt angle or by placement of the content forming the first image 52 on the first display 22. Content placement and related offset may be driven based of the privacy needs of the displayed content.

Use case 2: the apparatus 10 recognizes the user 80 by using face recognition techniques. The user 80 can adjust the fold angle 40 and the orientation of the apparatus 10 with respect to herself, to superimpose the (virtual) reflected first image 53 and the second image 54 properly. The full combined content can be observed/realized only when looking directly at the superimposed dual layer image (combination image 56).

The user 80 can focus on the content rendered via the first display 22 (eye focused on the virtual reflected first image 53).

The user can focus on the content rendered on the second display 24 (eye focused on the real second image 54)

The user can have a focus distance somewhere between the virtual reflected first image 53 produced via the first display 22 via the reflection surface 12 and the real second image 54 rendered on the second display 24 (bottom display). When the apparatus 10 is properly aligned with respect to the user 80 and the fold angle 40 is adjusted according to the content rendering, the user perceives the superimposed image (a combination of the reflected first image 53 and the second image 54).

Only the user can see a proper combination of the reflected first image 53 and the second image 54 images, and for any other person the combination image 56 is deteriorated. A person next to the user can perceive only a deteriorated image.

Use case 3: the apparatus 10 recognizes the user 80 and tracks the user's orientation with respect to the apparatus 10 by using computer vision or other techniques. For the tracking, the alignment of a camera of the apparatus 10 and/or the reflection form the reflection surface 12 may be utilized. The fold angle 40 of the apparatus 10 can be detected e.g., determined by proximity sensor or sensing the hinge angle 40 and the proper alignment of the content can be done based on the analysis of the measurement results and the known geometry of the apparatus 10. The apparatus 10 renders and aligns the virtual reflected first image 53 and the real second image 54 accordingly and the user perceives a properly superimposed image as the combination image 56.

Use case 4: the apparatus 10 is used in layered 3D mode, essentially as a dual layer 3D screen. When the apparatus 10 is folded, the user 80 can perceive true 3D content with actual physical separation between the focused layers (the reflected first image 53 and the second image 54). The folding angle 40 of the apparatus 10 determines the depth range i.e., the separation of the content layers in depth dimension. The first display 22 and the second display 24 together can render the reflected first image 53 and the second image 54 as different content layers.

In this scenario, the user 80 can peek behind an item in a front layer to see better what is rendered behind, in the back layer.

The layers can be layers of an application like layers of platformer or jump 'n' run games. The layers can be a layer of User interface (UI) components and a layer of application content. The layers can be Tooltips and other additional information related to an object rendered on another layer Use Case 5: the user 80 is provided with means to interact with the content of the combination image 56. It is not necessarily intuitive to touch the (physical) reflection surface 12 directly, so interaction related to the content of the first image 52 (reflected first image 53) from the first display 22 can be performed with the perceived virtual reflected first image 53, created by the reflection on the reflection surface 12, and floating in the air below the second display 24.

A more natural "touch" interaction solution includes the device tracking the finger position in relation to the content of the virtual reflected first image 53. This enables interaction similar to actual touch screen.

As the second display 24 is blocking the user's view of the finger manipulating elements on the virtual reflected first image 53 while the elements are visible for the user 80, the apparatus can assist the touch interaction by displaying cues on the second (and/or first) display(s) 22, 24, such as visualized outlines of the 3D tracked finger, highlight of the approaching touch point. Perception of a successful touch event can be enhanced with different types of cues, such as vibration of the apparatus 10, audio feedback, etc.

Touch interaction can be performed normally with the second display 24. While performing touch interaction with the second display 24, the information displayed on the first display 22 and seen as a virtual reflected first image 53, may get occluded by the finger. This could be compensated by displaying the occluded reflected first image 53 on the second display 24 and blended with the second image 54 of the second display 24.

The apparatus 10 can be a flexible or foldable display device, where the surface of the device has specular reflection scattering characteristics and the orientation of the device with respect to the user and the angle 40 between the surfaces can be detected. Such surfaces can be, for example, the glass of a mobile device or tablet display. In addition to the external optical surface of the device, the specular reflection may occur with any internal layer where the refractive index changes.

Content rendering parameters may change according to the fold angle 40 and orientation of the apparatus 10, and the level of privacy of the content. Only the proper combination of the fold angle 40, apparatus orientation and rendering of the two overlaid images define the complete information meant to be perceived by the user. The proposed invention improves significantly the privacy of the user 80 because other people nearby can't perceive the content rendered in a comprehensible format.

FIG. 11 illustrates an example of a controller 400 suitable for use in an apparatus 10. Implementation of a controller 400 may be as controller circuitry. The controller 400 may be implemented in hardware alone, have certain aspects in software including firmware alone or can be a combination of hardware and software (including firmware).

As illustrated in FIG. 11 the controller 400 may be implemented using instructions that enable hardware functionality, for example, by using executable instructions of a computer program 406 in a general-purpose or specialpurpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 10 when loaded into the processor 402. The computer program instructions, of the computer program 406, provide the logic and routines that enables the apparatus to perform the methods illustrated in the accompanying FIGURES The processor 402 by reading the memory 404 is able to load and execute the computer program 406.

The apparatus 10 comprises:
at least one processor 402; and
at least one memory 404 including computer program code
the at least one memory 404 and the computer program code configured to, with the at least
one processor 402, cause the apparatus 10 at least to perform:
adapting a first image 52 displayed on a first display 22 so that it can be viewed (e.g. read) by a user 80 via reflection at a reflection surface 12 that has a user-adjustable angle 40 relative to the first display 22; and
simultaneously displaying a second image 54 on a second display 24 wherein the second image 54 and the reflected first image 53 are portions of a combination image 56.

The apparatus 10 comprises:
at least one processor 402; and
at least one memory 404 including computer program code,
the at least one memory storing instructions that, when executed by the at least one processor 402, cause the apparatus at least to:
adapting a first image 52 displayed on a first display 22 so that it can be viewed (e.g. read) by a user 80 via reflection at a reflection surface 12 that has a user-adjustable angle 40 relative to the first display 22; and
simultaneously displaying a second image 54 on a second display 24 wherein the second image 54 and the reflected first image 53 are portions of a combination image 56.

As illustrated in FIG. 12, the computer program 406 may arrive at the apparatus 10 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 10 may propagate or transmit the computer program 406 as a computer data signal.

A computer program comprising computer program instructions that when loaded into one or more processors causes:
Adaptation of a first image 52 displayed on a first display 22 so that it can be viewed (e.g. read) by a user 80 via reflection at a reflection surface 12 that has an adjustable angle 40 relative to the first display 22 and
Simultaneous display of a second image 54 on a second display 24 wherein the second image 54 and the reflected first image 53 are portions of a combination image 56.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory or memories that work together to cause an apparatus, such as a mobile phone or server, to perform various functions and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying FIGURES may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The apparatus 10 can be any suitable device, apparatus or system that displays content. In at least some examples, the apparatus 10 is a hand-portable apparatus.

A hand-portable apparatus is an apparatus than can be used while held in one hand and operated by another hand. In at least some examples, the hand-portable apparatus has a mass less than 0.5 kg. In at least some examples, the apparatus 10 is additionally a pocket-portable apparatus. A pocket-portable apparatus is an apparatus than can fit into a pocket in clothing. In at least some examples, the pocket-portable apparatus has a length less than 20 cm, a width less than 10 cm and a depth less than 3 cm.

As used here 'module' refers to a unit or apparatus that excludes certain parts/components that would be added by an end manufacturer or a user. The apparatus 10 can be a module.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:
    a first display for displaying a first image;
    a second display for displaying a second image;
    a reflection surface configured to reflect the first image displayed on the first display towards a user of the apparatus, wherein an angle between the first display and the reflection surface is user adjustable; and
    a controller caused to adapt the first image displayed on the first display so that it can be viewed via reflection and
    caused to control display of the first image on the first display and the second image on the second display wherein simultaneous viewing of a reflection of the first image displayed on the first display in the reflection surface and of the second image displayed on the second display creates a combination image based on the angle adjusted by the user.

2. An apparatus as claimed in claim 1, wherein the controller is further caused to adapt the first image displayed on the first display so that is mirror-image text that in reflection forms readable text.

3. An apparatus as claimed in claim 1, wherein the controller is further caused to shift the first image in dependence upon an angle between the first display and the reflection surface.

4. An apparatus as claimed in claim 1, wherein the controller is further caused to at least one of shift the first image in dependence upon a change in a detected angle between the first display and the reflection surface or
    manually shift the first image to compensate for a change in the angle between the first display and the reflection surface.

5. An apparatus as claimed in claim 4, wherein the second image displayed on the second display is caused to be viewed directly.

6. An apparatus as claimed claim 4, wherein the controller is further caused to cause a relative shift between the first image displayed on the first display and the second image displayed in the second display to control registration between the first image and the second image in the combination image viewed by the user.

7. An apparatus as claimed in claim 6, wherein the shift is adjusted to maintain registration between the first image and the second image in the combination image.

8. An apparatus as claimed in claim 7, wherein the shift is adjusted at least one of in dependence upon a change in the angle between the first display and the reflection surface or in dependence upon a detected user position viewing angle.

9. An apparatus as claimed in claim 4, wherein the controller is further caused to decompose an image into the first image and the second image, wherein simultaneous viewing of a reflection of the first image displayed on the first display in the reflection surface and of the displayed second image substantially recreates the image.

10. An apparatus as claimed in claim 4, wherein the first image is an image of a first focal plane of the combination image and the second image is an image of a second focal plane, different to the first focal plane, of the combination image wherein the combination image is a combination of the image of the first focal plane and the image of the second focal plane.

11. An apparatus as claimed in claim 1, wherein the first image comprises at least one of portions of sentences, portions of words or portions of characters and the second image comprises at least one of different portions of sentences, different portions of words or different portions of characters, wherein the combination image has semantic meaning that is rendered clearly when simultaneously viewing a reflection of the first image displayed on the first display in the reflection surface and the second image displayed on the second display.

12. An apparatus as claimed in claim 1, wherein the reflection surface is configured as a touch sensitive surface.

13. An apparatus as claimed in claim 1, wherein the reflection surface is transparent and overlays the second display.

14. An apparatus as claimed in claim 1, wherein the controller comprises;
    at least one processor; and
    at least one memory storing instructions that, when executed by the at least one processor, cause the apparatus at least to perform as described.

15. A method, comprising:
    adapting a first image displayed on a first display so that it can be viewed by a user via reflection at a reflection surface that has a user-adjustable angle relative to the first display; and
    simultaneously displaying a second image on a second display wherein the second image and the reflected first image are portions of a combination image based on the angle adjusted by the user.

16. A method as claimed in claim 15, further comprising adapting the first image displayed on the first display so that is mirror-image text that in reflection forms readable text.

17. A method as claimed in claim 15, further comprising shifting the first image in dependence upon an angle between the first display and the reflection surface.

18. A method as claimed in claim 15, further comprising at least one of shifting the first image in dependence upon a change in a detected angle between the first display and the reflection surface or manually shifting the first image to compensate for a change in the angle between the first display and the reflection surface.

19. A method as claimed in claim 18, wherein the second image displayed on the second display is configured to be viewed directly.

20. A method as claimed in claim 18, further comprising causing a relative shift between the first image displayed on the first display and the second image displayed in the second display to control registration between the first image and the second image in the combination image viewed by the user.

* * * * *

UNITED STATES PATENT AND TRADEMARK OFFICE
CERTIFICATE OF CORRECTION

| | | |
|---|---|---|
| PATENT NO. | : 12,375,637 B2 | Page 1 of 1 |
| APPLICATION NO. | : 18/360050 | |
| DATED | : July 29, 2025 | |
| INVENTOR(S) | : Marja Pauliina Salmimaa, Toni Johan Järvenpää and Arto Juhani Lehtiniemi | |

It is certified that error appears in the above-identified patent and that said Letters Patent is hereby corrected as shown below:

On the Title Page

Item (54) and in the Specification, Column 1, Lines 1-3, should read:
AN APPARATUS, METHOD, COMPUTER PROGRAM FOR DISPLAYING CONTENT TO A USER Signed and Sealed this
Twenty-eighth Day of October, 2025

John A. Squires
*Director of the United States Patent and Trademark Office*